US007270275B1

(12) United States Patent
Moreland et al.

(10) Patent No.: US 7,270,275 B1
(45) Date of Patent: Sep. 18, 2007

(54) SECURED PIN ENTRY DEVICE

(75) Inventors: Flynt Moreland, Plano, TX (US); Douglas Busch, Coppell, TX (US); James Hoffmaster, Rockwall, TX (US); Doug Powers, Keller, TX (US); Mark Levenick, Flower Mound, TX (US)

(73) Assignee: NCR Corporation, Dayton, OH (US)

( * ) Notice: Subject to any disclaimer, the term of this patent is extended or adjusted under 35 U.S.C. 154(b) by 13 days.

(21) Appl. No.: 10/933,020

(22) Filed: Sep. 2, 2004

(51) Int. Cl.
*G06K 19/06* (2006.01)
*H01H 3/02* (2006.01)

(52) U.S. Cl. .................................... 235/492; 200/61.93

(58) Field of Classification Search ................ 235/492; 200/61.93, 5 A, 344; 345/168–172
See application file for complete search history.

(56) References Cited

U.S. PATENT DOCUMENTS 5,406,630 A 4/1995 Piosenka et al.
6,065,679 A * 5/2000 Levie et al. ........... 235/462.47
6,317,835 B1 11/2001 Bilger et al.
6,669,100 B1 12/2003 Rogers et al.
6,705,517 B1 3/2004 Zajkowski et al.
6,736,313 B1 5/2004 Dickson
2003/0025617 A1* 2/2003 Kunigkeit et al. ............ 341/22

OTHER PUBLICATIONS

"Triple DES PIN Encryption for Automated Teller Machines"; BankersOnline (Jul. 8, 2002).

Istnick, A. and E. Caligaris; "ATM Fraud and Security", Diebold (2003).

Poulsen, K.; "The ATM keypad as security portullis", SecurityFocus (Jul. 21, 2004).

"PIN Entry Device Security Requirements Manual"; Payment Card Industry (Apr. 2004).

* cited by examiner

*Primary Examiner*—Michael G. Lee
*Assistant Examiner*—Jamara A. Franklin
(74) *Attorney, Agent, or Firm*—Michael Chan

(57) ABSTRACT

The invention is a keypad for securely entering personal identification numbers onto automated teller machines (ATM) or similar devices. A frame secures a flexible keypad to a printed circuit board. The front of the circuit includes a set of tamper detection contacts whose electrical circuit is completed by conductive material on the keypad surface. A moat of conductive material surrounds the tamper detection contact. Opening the circuit by removing the keypad or shorting the circuit to the moat initiates a tamper response.

Attached to the reverse side of the printed circuit board are security sensitive electrical components. These security sensitive components include a static random access memory storing cryptographic information and a crypto processor. A plastic cover imprinted with a tamper detection grid forming multiple electrical circuits coupled to a tamper detection circuit covers these components. A border of conductive material on the printed circuit board also surrounds these components. Opening or shorting any of the circuits in the grid initiates a tamper response, and shorting any of the components to the border also initiates a tamper response.

8 Claims, 4 Drawing Sheets

SECURED PIN ENTRY DEVICE

TECHNICAL FIELD OF THE INVENTION

A secured keypad for entering personal identification numbers on automated teller machines (ATM) or similar devices.

BACKGROUND OF THE INVENTION

The world's first automated teller machine (ATM) went into operation in Enfield Town, England, a borough of London, at Barclays Bank on Jun. 27, 1967. This initial ATM invention is generally credited to John Shepherd-Barron, although George Simjian registered patents in the United States in the 1930s and Don Wetzel and two other engineers from Docutel obtained a patent on an ATM on Jun. 4, 1973.

In its initial and early reiterations, an ATM could only be used by customers possessing a checking or savings accounts with the bank where the ATM was located using a proprietary ATM network. By the early 1980s, banks began to take advantage of improvements in telecommunications technology to form shared ATM networks allowing customers of one bank in the network to withdraw money by using ATMs of other banks in the network. Most modem ATMs are linked to interbank networks that enable customers to withdraw money from ATMs not belonging to the bank possessing their account. This is a tremendous convenience for people travelling and can not make withdrawals in places where one's bank has no branches or for customers with odd working hours.

In modem ATMs networks, customers authenticate themselves using a plastic card with a magnetic stripe, very similar to a credit card, encoded with the customer's account number. The customer can then access their account by entering a numeric passcode called a PIN (personal identification number), which in some cases may be changed using the machine. ATMs generally authorize and perform a transaction by communicating with the card issuer or other authorizing institution using the communications network. Because of the added convenience and desire of customers and consumers, there is now now a flourishing business of placing ATMs in grocery stores, malls, and other locations separate and apart from banks connected to the interbanking network so that customers can access their accounts for withdrawals.

ATMs are very reliable, but if they do malfunction typically the greatest harm to a customers is not being able to obtain cash until they can get to the bank during operating hours. Some errors are not to the detriment of customers since there have been cases of machines giving out money without debiting the account or dispensing higher value notes because of incorrect cash denominations loaded into the money storage cassettes. Errors that can occur may be mechanical (e.g card mechanisms, keypads, hard disk failures, memory problems, etc.); software (e.g. operating system, device driver, application, or malicious attack, etc.); communications (e.g. severed link, overload, etc); or operator error.

To ensure confidentiality and the security of customers' accounts, ATMs contain secure crypto processors implemented in a variety of ways, The security of the machine relies on the integrity of the secure crypto processor because the host software often runs on a standard operating system such as Windows or Linux. ATMs may operate on embedded processor circuit boards with custom operating systems or on personal computers using standard operating systems such as Windows 2000 or XP and Linux. Other software platforms include RMX 86, OS/2 and Windows 98 bundled with Java.

ATMs are being targeted by increasingly sophisticated attacks aimed at compromising the accepted security protocol of a magnetic stripe card coupled with a PIN. ATM transactions are usually encrypted with DES (data encryption system) or Triple DES. The plaintext PIN never leaves the PED (Pin Encryption Device) to travel unsecured within the ATM or over the banks' communication network and is generally encrypted by electronic computer circuitry located in close proximity to the PED. "Phantom withdrawals" from ATMs are a somewhat mysterious phenomeon which in the past banks have tended to ascribe to fraud by customers. However, it has become increasingly obvious that many such phantom withdrawals are the result of criminal activity undertaken by sophisticated thieves exploiting vulnerabilities in the current generation of ATMs. There have been incidents of fraud where criminals have used fake machines or have attached fake keypads or card readers to existing machines. These have then been used to record customers' PIN and bank card account details in order to gain unauthorised access to the accounts.

Past efforts to secure PINs have not been successful and banks and credit card companies are seeing increasing losses because of increasingly sophisticated ATM fraud that amounts to about $50 million a year in the U.S. alone. A variety of methods for cloning or stealing victim's ATM and credit cards along with their associated PIN have developed over the years.

One older technique used by a thief to compromise a card and PIN is to install a magstripe reader to the mouth of the machine's real reader designed to look like part of the machine. The reader skims each customer's card as it slides in copying the encoded card information. To obtain the PIN thieves attached fake PIN pads over the real PED that stores the keystrokes without interfering with the ATM's normal operation. They can then create a phony card later and use the PIN to access the account.

Newer techniques use skimmer devices for obtaining card encoded data installed directly over the real card input slot on the ATM so that any card inserted into the ATM is scanned and the encoded card information read and stored. These skimming devices can capture and store account number information, account balances, and verification codes that can then be copied onto a counterfeit card.

Even newer methods for obtaining the PINs have focused on sophisticated methods to tap the current generation of PEDs. "Tapping" or "wiretapping" consists of the unauthorized electronic monitoring of a signal (voice or digital) transmitted over a communication or computer circuit. A monitoring device capturing this signal and data is a "tap." Generally, a tap usually attaches to a phoneline or junction box or inside a phone, modem or computer. However, in the context of an ATM, a tap must be placed in close proximity to a PED because usually a PIN input is encrypted by electronic components within a very short physical distance measured in inches from the PED. These older generation PEDs can be vulnerable to taps because a cable runs from the PED to the ATM's internal encryption circuitry.

In one method for tapping a PED, the individual keycaps are opened to insert a small sensor/transmitter under the keypad. Whenever the keypad is depressed, a signal is transmitted to a receiver that records the PIN. Another technique is to remove the front face of the PED and attach another front face that records PIN inputs. A thief can also tap into the communication link from the keypad inputs of the PED to obtain a PIN before the electronic signals representing the PIN are processed and encrypted. Yet another method is to remove the PED and insert a thin overlay tap between the key pads and the key sensors that detect and transmit a signal when depressed. Another option is to implant a tap to download cryptographic data or monitor plain text PIN inputs and corresponding encrypting PIN data for later analysis. There is a need for a secured PED design that resists attempts to tap or otherwise tamper with the PED to compromise the PIN or other confidential information.

SUMMARY OF THE INVENTION

The invention is a multilayered design for a secure PED (SPED) that prevents unauthorized, undetected tampering. The front of the SPED has multiple tamper detection contacts placed throughout the sides and center of the SPED printed circuit board. Each of these tamper detection contacts is protected from injecting a conductive substance that would short the contact and bypass detecting removal of the keypad from the printed circuit board. This injection protection is a grounding contact separated by a non-conductive moat encircling the tamper detection contacts. Tamper detection circuits continually monitor the tamper detection contacts so that if the circuit's electronic signal fluctuate because of breaks or shorts, the SPED's tamper response protocol activates.

The rear of the SPED is protected by a tamper detection grid. The printed circuit board has 100 pins, 25 to each side, that make contact with traces connecting to tamper detection circuits. An open or short circuit between any two points on the tamper detection grid lasting more than 0.16 seconds or other deviations from a normal electrical state activates the tamper response protocol.

The tamper response protocol erases all cryptographic keys and other sensitive data on the SPED. The ATM is rendered inoperable by the protocol. The construction of the SPED also makes any attempt to penetrate the SPED to insert a PIN disclosing tap or make a PIN disclosing functional modification visually obvious because of damage to or inoperability of the SPED.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
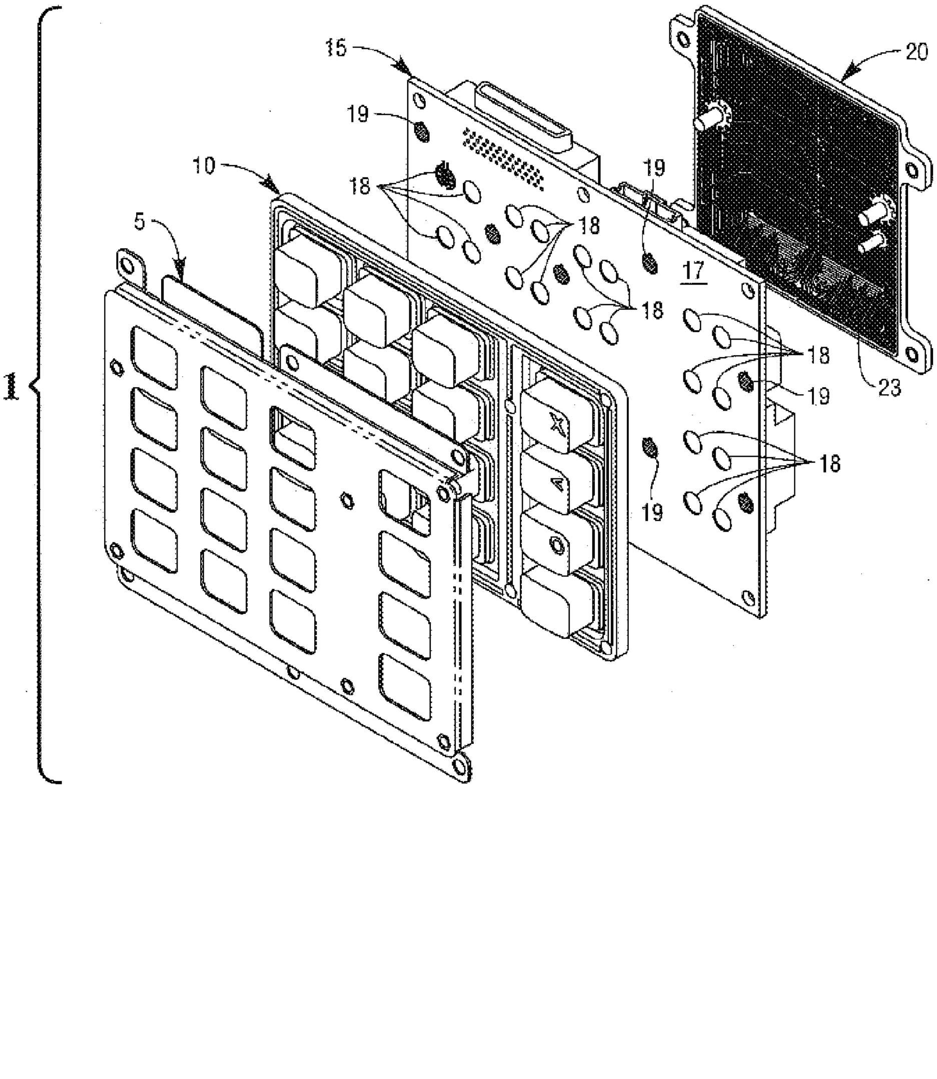
FIG. 1 shows the basic components of the invention and how they fit together.

The invention is a Secure PIN Encrypting Device (SPED) used to generate an encrypted PIN (Personal Identification Number) for use over an ATM network. FIG. 1 shows the basic overall construction of the SPED and the different basic components. The SPED consists of a front keypad frame 5 that that secures a keypad 10 made of rubber or other suitable soft, waterproof, flexible material with sixteen keycaps 11. The keypad frame 5 and keypad 10 attach to the front of a printed circuit board (PCB) 15.

The PCB 15 is made from hard plastic and supports a number of electrical components. The front side of the PCB 17 includes contacts 18 registering keypad 10 depressions. The front side of the PCB 17 also includes tamper detection contacts 19 designed to detect efforts to remove the keypad cover 5 and the keypad 10. The back side of the PCB 17 includes the mounted electrical components such as connectors, a battery, and a speaker. The components also include the SPED security circuits including the crypto processor, static random access memory (SRAM) storing the encryption keys, and tamper detection circuitry. A rigid plastic cover 20 with embedded or imprinted electric conductive traces 23 covers the portion of the back of the PCB 15 with the sensitive crypto processor and SRAM components. Additionally, the sensitive components are potted with an epoxy material to further reduce the possibility of tampering. The several non-security relevant components such as interface connectors, the battery, and the speaker are not protected by the plastic cover.

Figure 2:
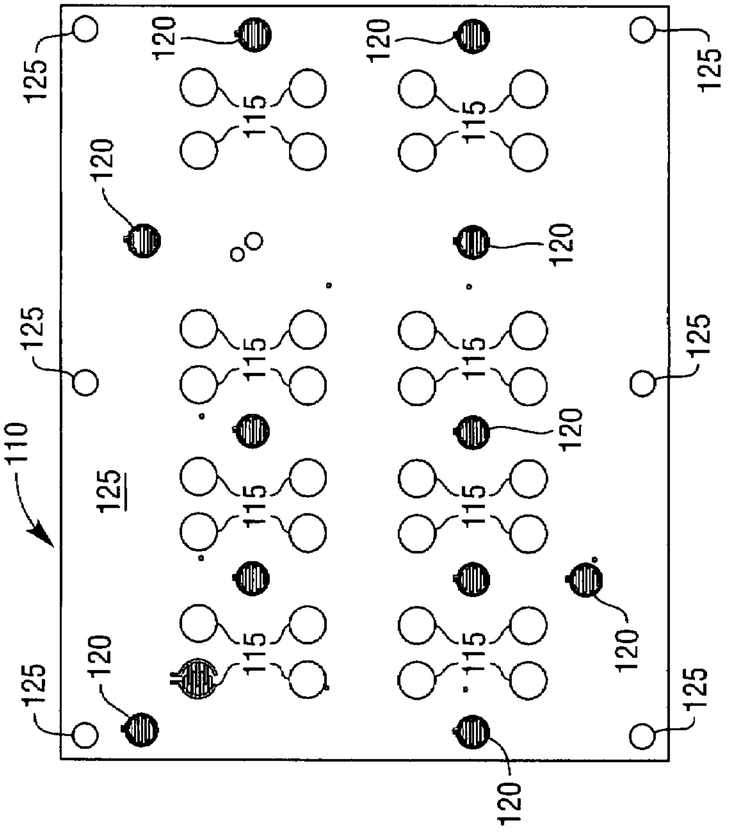
FIG. 2 shows the basic electronic components on the front side of the printed circuit board.

The SPED is designed to prevent the penetration and modification of the SPED to disclose future PIN inputs without damaging the SPED to such an extent that it either becomes inoperative or has a high probability of detection. The front portion of the SPED forward of the front side of the PCB 15 has tamper detection mechanisms. Referring to FIG. 2, two types of contacts are found on the front side 105 of the PCB board 110. The front side 105 has thirty-two conductive contact pads 115 that complete an electrical circuit when a keycap on the keypad, which has an electricity conductive backing on a wider keycap base, is depressed. Two conductive pads are present for each of the keycaps on the keypad. The keypad also has eleven conductive pads integrated into the rubber material throughout the sides and center of the back side of the keypad, while the front side of the SPED PCB 105 has a corresponding eleven tamper detection contacts 120. There are also six holes 125 for inserting a bolt or screw through to assemble the SPED.

Figure 4:
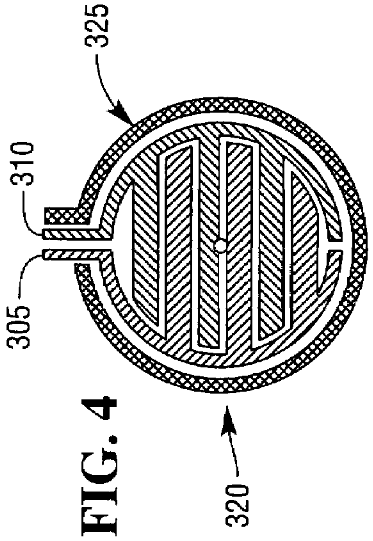
FIG. 4 shows the construction of a tamper detection contact located underneath the keypad.
Figure 3:
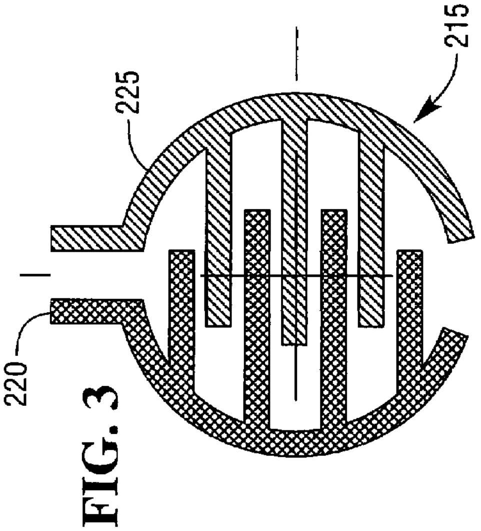
FIG. 3 shows the construction of a conductive pad underneath a keycap for making an input.

FIG. 3 and FIG. 4 show the differences between the construction of the conductive pads 115 and the tamper detection contacts 120. Referring to FIG. 3, the conductive pad 215 for detecting keypad inputs consists of two separate adjacent layers of conductive material, such as copper, on the PCB. There is a left side matrix of circular conducting material 220 and a right side matrix of circular conducting material 225. The left and right sides 220 and 225 are designed so that electrical conducting material is essentially intertwined with extensions of conductive traces from the left side 220 and right side 225 forming an interlocking pattern of conductive traces with space between the two intertwined and interlocking conductive traces leaving an open electrical circuit. Depressing a keycap on the keypad has a high probability of completing the electrical circuit between the left side 220 and right side 225 that is registered by the SPED. In the preferred embodiment, a pair of conductive pads 215 are located adjacent to each other under each key of the keypad.

FIG. 4 shows a tamper detection contact. The tamper detection contact 325 consists of two separate adjacent layers of conductive material, such as copper, on the PCB. There is a left side matrix of circular conducting material 305 and a right side matrix of circular conducting material 310. The left and right sides 305 and 310 are designed so that electrical conducting material is essentially intertwined to form an interlocking pattern of conductive traces with space between the two intertwined and interlocking conductive traces leaving an open electrical circuit. On the keypad, there is a corresponding area of conductive material that after assembly is in constant contact with the two sides 305 and 310 of the tamper detection contact 325 so as to complete an electrical circuit in a tamper detection circuit. When the SPED is assembled, the keypad frame holds the rubber keypad against the front side of the PCB and causes these conductive areas on the keypads to complete an electrical circuit with the tamper detection contacts 320 between the two sides 305 and 310 in much the same fashion as the conductive pad 215. Removing the keypad interrupts the electrical circuit resulting in fluctuations of the signal in the tamper detection circuit to indicate tampering with the SPED.

One possible method to defeat conductive contacts such as this is to inject a conductive substance behind the keypad contact so that ink fills the space between the interlocking conductive traces of left side 305 and right side 310. Removing the keypad with conductive substance filling in the space will then not open the circuit to detect tampering because of the shorted contacts. To prevent this bypassing attack, each of these tamper detection contacts 320 are protected from conductive substance injection by an encircling ground trace 325 separated by a moat 330 of non-conductive material from the left side 305 and right side 310 contacts. Shorting left side 305 or right side 310 to the encircling ground trace 325 across the moat 330 signifies tampering because of the disruption to the detection circuit signal.

Each tamper detection contact 320 is on one of four independent tamper detecting electrical circuits. These circuits are monitored continuously by the SPED's tamper detection mechanisms and have a predetermined electrical state and signal for normal operation. Any attempt to lift or remove the rubber keypad will cause the circuit to be broken or modified and trigger the tamper response protocol because of the resulting fluctuation in the electrical signal of the circuit. If any of the circuits are shorted to the moat 330, the SPED's tamper response protocol is also activated. The tamper response protocol initiates and erases the stored cryptographic keys and other security sensitive data from the SPED.

Figure 5:
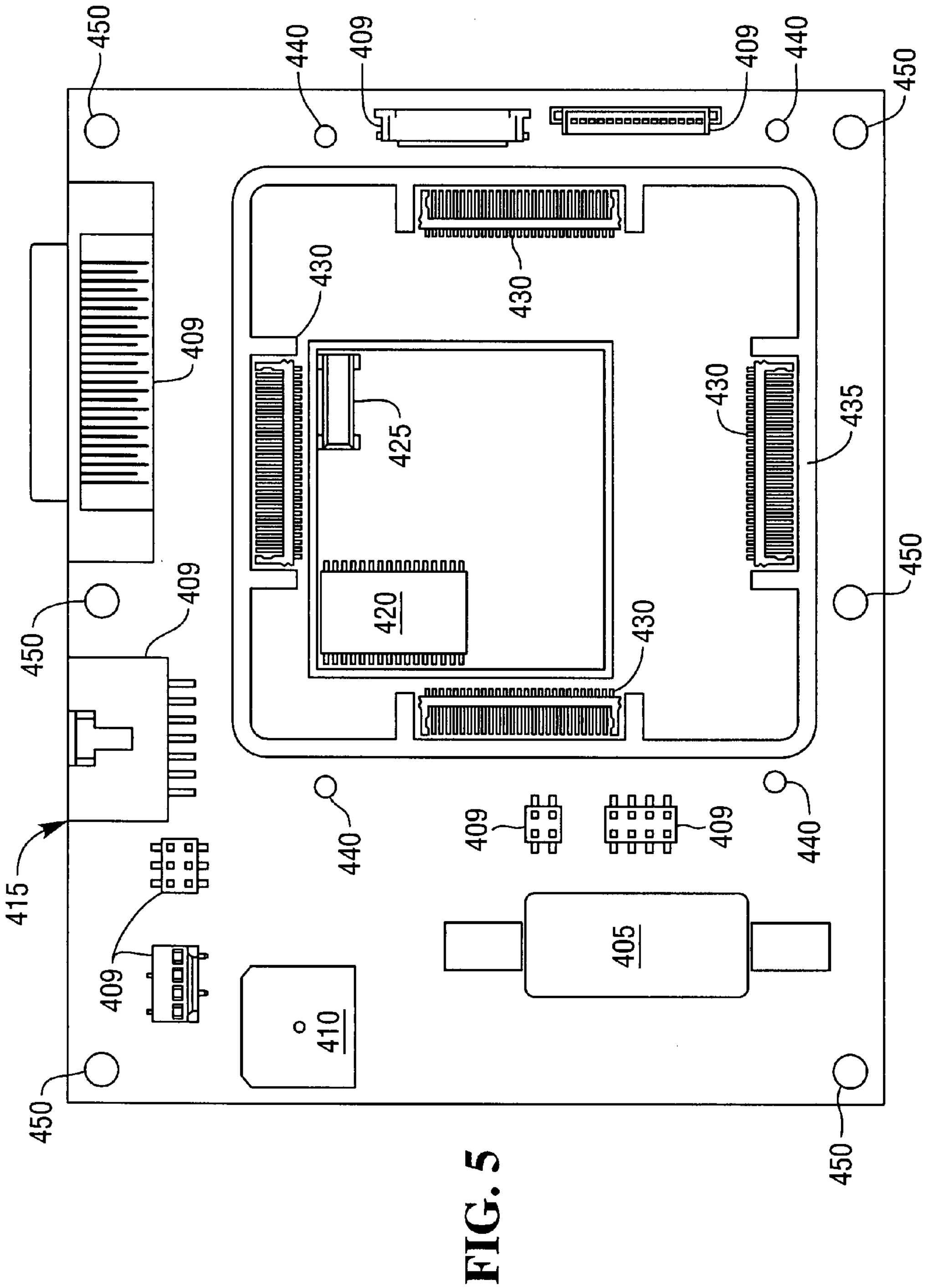
FIG. 5 shows the basic construction of the printed circuit board used in the invention.

FIG. 5 shows the reverse side of the PCB and the sensitive and non-sensitive electrical components. The battery 405, a speaker 410, and electrical connectors 409 on the PCB 415 are not security sensitive electrical components requiring enhanced protection. The PCB has tamper detection mechanisms that secure the sensitive security electrical components which include a crypto processor 420 and a static random access memory (SRAM) 425 storing the encryption keys.

A plastic cover protects all of these security sensitive components on the PCB 415. The PCB has 100 pins divided into four separate pin connectors 430 (25 for each side of the plastic enclosure) that connect to traces connecting each of five individual tamper detection circuits in the plastic cover. A ground trace 435 also surrounds the security sensitive components to prevent bypassing of the tamper circuits using conductive material. Four holes 440 in the PCB 415 are used to attach the plastic cover over the security components. There are also six holes 450 that are used to assemble the SPED.

Figure 6:
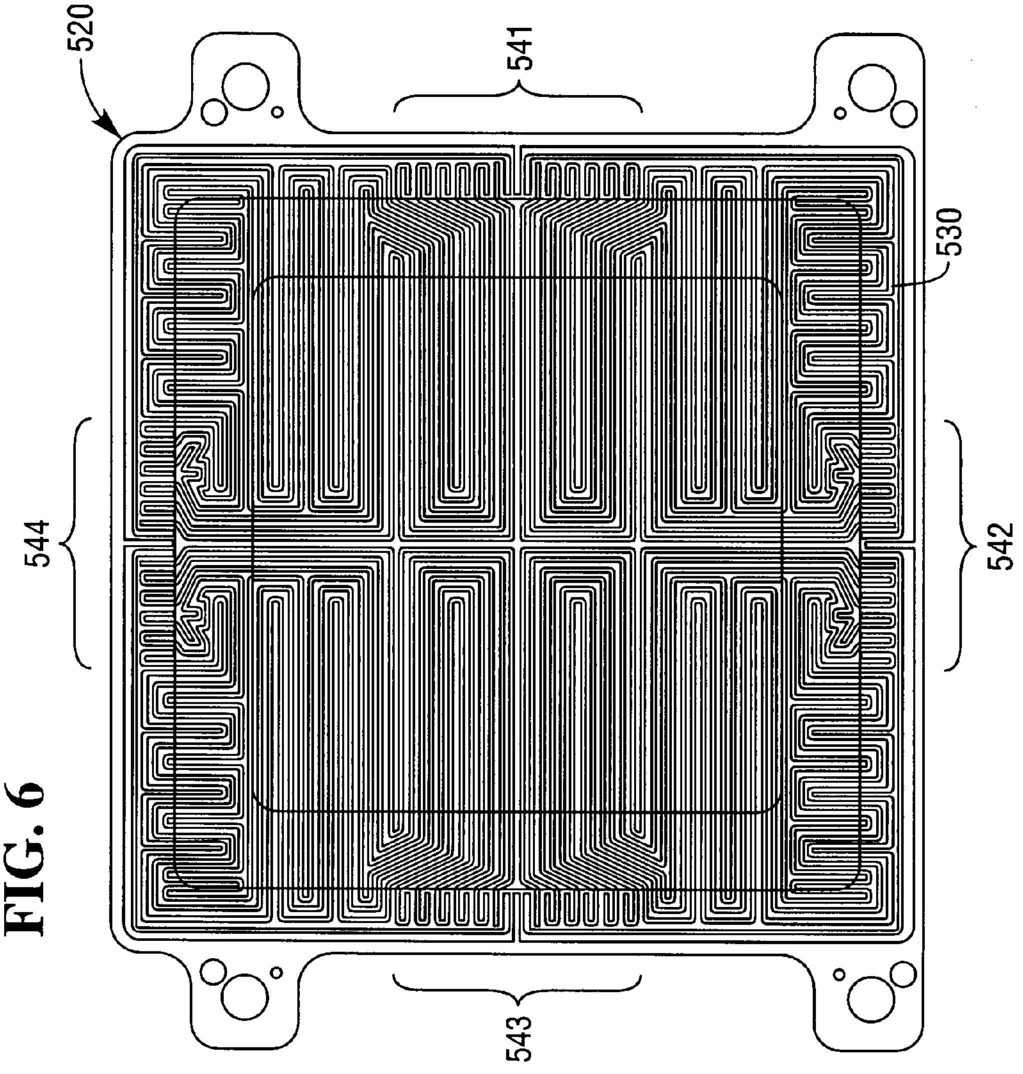
FIG. 6 shows the construction of the plastic cover with an imprinted tamper detection grid.

FIG. 6 shows the plastic cover with the embedded or imprinted tamper detection grid. The entire inside surface of the cover 520, including the back and sides of the cover, is protected by a tamper detection grid 530. This tamper detection grid 530 consists of five separate circuits. The PCB for each side of the plastic cover corresponds to a set of contacts. When mounted to the PCB, there is a right set of contacts 541, a bottom set of contacts 542, a right set of contacts 543, and a top set of contacts 544 on the detection grid 530.

Figure 7:
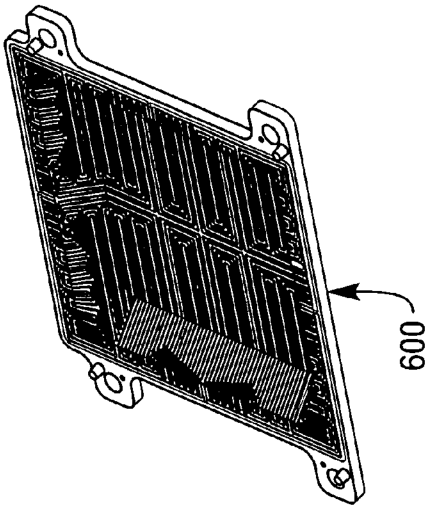
FIG. 7 is a perspective view plastic cover showing its three dimensional structure.

FIG. 7 is a perspective view of the plastic cover 600 revealing the three dimensional structure of the cover. The PCB connects with the traces connecting to each individual tamper detection circuit in the plastic cover 600. Each of the circuits has a predetermined electrical state and signal for normal operation. The SPED's tamper detection mechanisms constantly check each of the five tamper detection circuits in the enclosure formed by the plastic cover and the PCB to ensure that the circuits have not been opened or shorted to any other circuit to cause a fluctuation in the electrical signal of the circuit from its predetermined, normal operating state. An open or short circuit between any two points of the tamper detection grid for more than 0.16 seconds will activate the tamper response protocol. Any attempt to drill through, melt, remove, or otherwise penetrate the plastic cover breaks or shorts one or more of the tamper detection circuits, causing a signal fluctuation and activating the tamper response to erase all cryptographic keys and other security sensitive data from the SPED. For additional security, the crypto processor, SRAM, and tamper detection circuitry are all encased in epoxy within the SPED's plastic enclosure.

The implementation of the SPED is such that penetrating and then altering the SPED to disclose future PINs (for example, inserting a PIN-disclosing bug or making PIN-disclosing functional modifications) damages the SPED to such an extent that either it becomes inoperative or it has a high probability of detection before the SPED is placed (back) into operational use. The tolerances on the front keypad are also such that there is not enough room for a PIN disclosing bug within the front keypad. Trying to enlarge the front keypad to create room for such a bug would result in tamper detection or obvious damage to the device. Furthermore, such physical intrusions can induce signal fluctuations in the tamper detection circuits to initiate the tamper response protocol.

The SPED is intended to resist the following specific attack scenarios. The first scenario is drilling through the cover protecting the security sensitive components with a hole larger than 1/16". Any attempt to drill a hole larger than 1/16" through the back cover will cut the tamper grid and trigger the tamper response. The second scenario is drilling through the cover protecting the security sensitive components with a hole smaller than 1/16". A hole small smaller than 1/16" still has a high likelihood of cutting the tamper detection grid or causing two adjacent grid traces to short together, triggering the tamper response. It is not feasible for an attacker to disable all five separate tamper grid circuits through one or several precisely drilled holes of 1/16". All security sensitive components within the cover are also covered with epoxy, and it is not feasible for an attacker to melt, grind, or otherwise remove the epoxy from the sensitive components through one or several precisely drilled holes of 1⁄16". The third scenario is melting the plastic cover protecting the security sensitive components. Any attempt to melt away the plastic cover would also melt the thin conductive traces composing the tamper detection circuit and triggering a tamper response.

The fourth scenario is to attack the pins connecting the cover's tamper detection grids to the PCB. The edges where the plastic cover touches the PCB are surrounded by the ground trace. This ground trace deters attacks that involve conductive material being injected or probes being run under the edge of the cover. The PCB has 25 pins for each side of the cover (100 total) that connect to the traces for the five tamper detection grid circuits. To successfully disable the grid and allow the cover to be removed, all 100 pins would have to be exposed and connected correctly without momentarily breaking the connection to the traces or shorting any of the pins and traces together and fluctuating the electrical signals in the circuit. The pins are protected by the tamper grid itself, so any attempt to access the pins via drilling would trigger tamper detection as described above. The only means to attack the pins without drilling through the cover would involve drilling from the front side of the PCB. Such an attack through the PCB would cause physical damage to the SPED that would render it inoperable, as well as being obvious to a customer using the ATM and perhaps disrupting the contacts through vibration and cause a fluctuation in the signal and detect the tampering.

The fifth scenario is disabling the front tamper detection contacts via conductive material injection. All eleven front tamper detection contacts are protected by the moat ground traces that encircle the contacts. The tolerance between the contact and the moat ground trace is small enough so that the injection of conductive material shorts across the moat to the ground contact, triggering tamper detection. The sixth scenario considered was cutting out the keycaps to emplace a PIN disclosing tapping device. The keycaps are designed with a base wider than the keycap opening in the keypad frame. Any attempt to cut and remove the keycap would have to cut the keycap away from the wider base. The keycap base is an integral part of the keycap function, so this removal would prevent the key from functioning once it was returned to use within the SPED.

While the invention has been particularly shown and described with respect to preferred embodiments, it will be readily understood that minor changes in the details of the invention may be made without departing from the spirit of the invention. Having described the invention, we

The invention claimed is:

1. A tamper detection circuit for a secured key-based entry device for a computer system comprising:

a keypad having a plurality of keycaps that initiate one or more electronic signals when depressed, the signals are used in a computer system;

a frame securing the keypad to the entry device;

a circuit board having electrical contacts that are coupled to a portion of one or more keycaps on the keypad when the keycaps are depressed, the one or more electronic signals are initiated by one or more electrical components on the circuit board based on the particular keycap being depressed;

a tamper detection contact on the circuit board comprising a first conductive pattern and a second conductive pattern, the tamper detection contact initiating a signal when the first and the second conductive patterns are not connected by an electrical switch applied between the first and second patterns;

a third conductive pattern surrounding a predetermined area around the first and second conductive patterns, the third conductive pattern coupled to a predetermined voltage level; and a non-conductive moat separating the third conductive pattern and either the first or the second conductive patterns, the non-conductive moat initiating a tamper detection response protocol by a transmission of electrical signals between the third conductive pattern and either the first or second conductive pattern.

2. A secured key-based entry device according to claim 1, further comprising:

a cover for the electrical components having a tamper detection grid coupled to the tamper detection circuit; and a surrounding layer of conductive trace material on the circuit board bordering the electrical components.

3. A secured key-based entry device according to claim 2, further comprising a tamper response-protocol initiated when tampering is detected by fluctuations in the electric signals from the tamper detection circuit coupled to the tamper detection grid.

4. A secured key-based entry device according to claim 1, wherein the electrical switch between the first and second patterns includes electrical conductive material on a keypad.

5. A secured key-based entry device according to claim 1, wherein the tamper response protocol renders the device inoperable.

6. A secured key-based entry device for a computer system comprising:

a keypad having a plurality of keycaps that initiate one or more electronic signals when depressed;

a frame securing the keypad to the entry device; and a circuit board having electrical contacts that are coupled to a portion of one or more keycaps on the keypad when the keycaps are depressed, the one or more electronic signals being initiated by one or more electrical components on the circuit board based on the particular keycap being depressed, the circuit board comprising a tamper detection contact which includes a first conductive trace, a second conductive trace which is electrically isolated from the first conductive trace, and a third conductive trace which is electrically isolated from the first and second conductive traces, wherein a tamper response protocol is initiated to either render the device inoperable or erase stored cryptographic information, or both, when the third conductive trace electrically shorts to either the first conductive trace or the second conductive trace.

7. A secured key-based entry device according to claim 6, wherein the electrical components include a static random access memory storing encryption keys.

8. A secured key-based entry device according to claim 7, wherein the electrical components include a crypto processor.

* * * * *